Aug. 19, 1952   B. E. BAILEY   2,607,438
CYCLONE SEPARATOR
Filed June 30, 1948   4 Sheets-Sheet 1

Bradford E. Bailey Inventor
By George J. Silhavy Attorney

Bradford E. Bailey Inventor

Bradford E. Bailey Inventor

Aug. 19, 1952　　　　　　　B. E. BAILEY　　　　　　2,607,438
CYCLONE SEPARATOR

Filed June 30, 1948　　　　　　　　　　　　　　　　4 Sheets-Sheet 4

Bradford E. Bailey Inventor
By George J. Silhavy Attorney

Patented Aug. 19, 1952

2,607,438

UNITED STATES PATENT OFFICE 2,607,438

CYCLONE SEPARATOR

Bradford E. Bailey, Elizabeth, N. J., assignor to Standard Oil Development Company, a corporation of Delaware Application June 30, 1948, Serial No. 36,179

3 Claims. (Cl. 183—83)

This invention relates to improvements in the cyclone type of separator for separating finely divided suspended particles from a fluid stream. More particularly, the invention is concerned with a device for the improved separation of suspended particles from a fluid stream by providing for successive separations in a plurality of stages.

In the cyclone type of separator the gases with their entrained solids are introduced into the device in a manner that imparts a spiral or swirling motion to them. The resulting centrifugal action causes the solid particles to be thrown to the outer wall of the cyclone and they are then allowed to slide down the wall into a collecting hopper. The purified gas stream is then removed from the separator by suitable means.

Cyclone separators are particularly adapted for removing finely divided solids or dust from gas or vapor streams. Thus they find use in the purification of air in any industrial installation where considerable dust is formed. A particularly useful application of these devices is in connection with organic reactions employing the fluidized catalyst technique, as for example, the catalytic treatment of petroleum fractions in cracking operations, hydroforming and the like, the synthesis of hydrocarbons by reaction of carbon monoxide with hydrogen, and other reactions of this type. Enormous amounts of catalyst are handled in catalytic units employing the fluidized catalyst technique and it is necessary to separate suspended or entrained particles of catalyst from exit gas streams so that this catalyst may be returned to the processing zone with a minimum amount of catalyst being lost. Even a small percentage loss from a large plant can amount to several tons of catalyst being lost from the unit per day. Most of this loss occurs as fine dust that cannot be separated efficiently when conventional cyclones are employed for the recovery of catalyst.

One object of the present invention is to provide a means for minimizing the loss of fine particles of catalyst from equipment when the fluidized solids technique is employed. More generally, the object of the present invention is to improve cyclone separating means for the separation of gases from solids suspended therein whereby a more efficient separation of very fine particles of solid material can be effected.

Other objects of the invention will appear from the following description and from the drawings.

Figure 1:
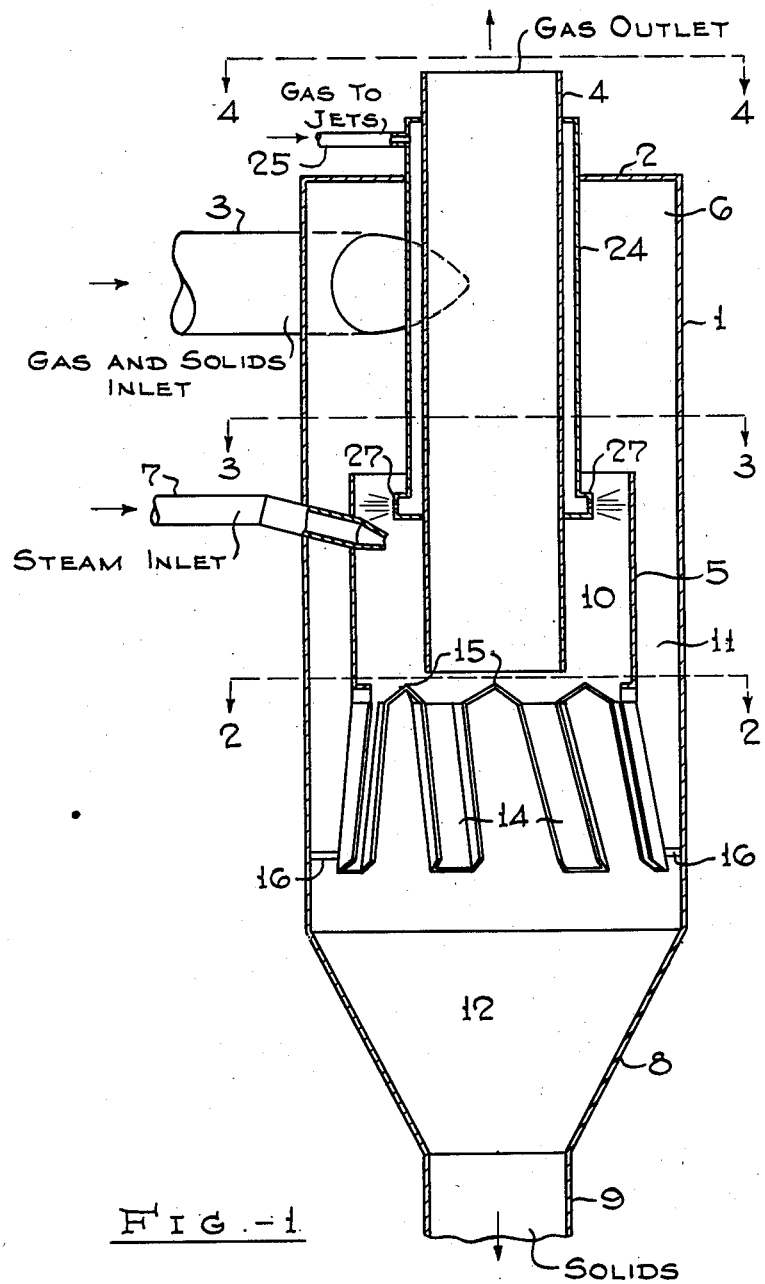
Figure 1 is a vertical axial section through a cyclone separator of the present invention.
Figure 2:
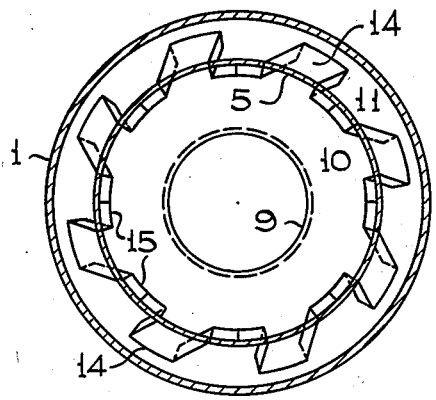
Figure 2 is a transverse cross section taken substantially along the line 2—2 of Figure 1, looking downward.
Figure 3:
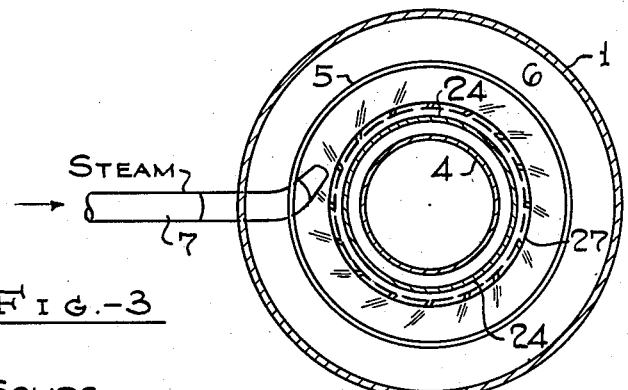
Figure 3 is another transverse cross section of the apparatus shown in Figure 1, taken substantially along the line 3—3 of said figure.
Figure 4:
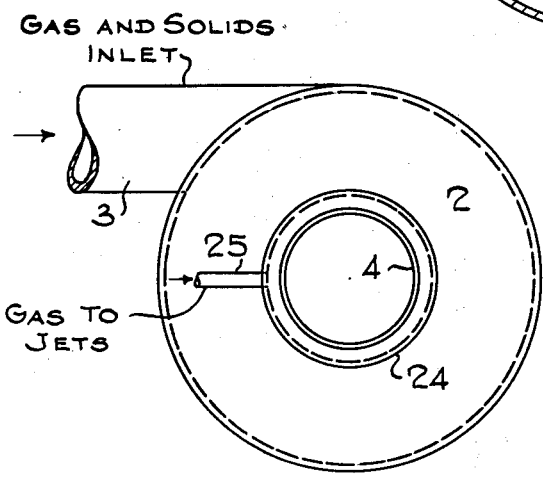
Figure 4 is a top view of the same apparatus, taken substantially along the line 4—4, Figure 1.

Referring now to the drawings, particularly Figures 1 to 4, inclusive, the cyclone separator as represented consists of an outer cylindrical casing 1 having a cover or upper end closure 2 and an inner cylindrical outlet tube 4, said casing and said outlet tube being co-axially disposed and thus forming between them the annular separation chamber 6. Positioned at or near the top of the cylindrical casing is a gas and solids inlet 3 which is so placed that it will discharge the gas mixture more or less tangentially into annular space 6. This arrangement sets up a rapid rotation of the gases which contain the solids to be separated.

Also positioned within the casing is an inner cylindrical shell 5 which is of smaller diameter than the casing 1 but of larger diameter than the outlet tube 4. Shell 5 is preferably so arranged as to be about midway between the elements 1 and 4. Preferably, the inside surface of inner shell 5 may be highly polished or chromium plated in order that the separation of fine particles from the gas stream may be additionally enhanced. Inner shell 5 may be supported in position by means of radially disposed ribs or rods suitably positioned as indicated by numeral 16 or by any other effective means.

Attached to the lower portion of the intermediate shell 5 are a plurality of downwardly directed trough-like chutes 14 which discharge into the lower space 12 of the cyclone. In lieu of chutes, hollow tubes may be used if desired. See Figures 5, 7, and 10. That portion of the bottom of the inner shell 5 which connects with the upper ends of the chute entrances is preferably flared so that the solids collected will be guided into the chute or tube openings. Between adjacent chutes (or tubes) the member 5 has an inturned lip and is notched upwardly so as to appear more or less inverted V-shaped. This modification is desirable in order to aid in directing the fine particles into the chutes or tubes 14. Also, it is preferred that the elements 14 be slightly twisted or spiraled with respect to the axis of the cyclone so that the gases passing through them will be given some degree of spiral rotation to aid further in the separation of solid particles. Preferably, also, the members 14 flare outwardly toward the inner wall of casing 1 so that solids falling from chutes 14 will join those sliding down the inner surface of the casing 1.

For greater efficiency, the cyclone may be fitted with one or more high velocity jets 7 which enter annular space 10 tangentially. Only one jet 7 is shown but two or more may be used. Air, steam or other gas will be introduced through these jets to impart additional rotational velocity to that part of the gas stream that carries the very fine material. This further facilitates separation of the extremely fine particles which are most difficult to separate.

The lower end of outer casing 1 may be joined to a frustro-conical member 8, the bottom of which opens into discharge pipe 9. This portion of the cyclone structure does not constitute an essential feature of the invention however, and the bottom space 12 of the cyclone may, if desired, be just simply constructed by a continuation of the vertical sides of casing 1 instead of using frustro-conical section 8 shown in Figure 1. The tapered section has the advantage of converging the solids to a central collecting point, at the sacrifice of some frictional hold-up.

The length of the inner shell 5 is so chosen that its upper portion terminates at a level below the tangential fluid inlet 3, and the length of the outlet tube 4 is such that its lower opening is about at or even slightly below the level of the upper openings of troughs or tubes 14.

As a result, there is formed in the upper portion of the cyclone the annular space 6, previously mentioned, between the outer shell 1 and outlet tube 4 extending axially of the separator for a substantial distance. Below the upper edge of inner shell 5 there are thus formed two annular spaces. One, designated by the numeral 11, is formed between outer casing 1 and inner shell 5. The other annular space, designated by the numeral 10, is formed between the inner shell 5 and the outlet tube 4. Direct communication exists between the inner annular space 10 and the upper openings of the tubes or chutes 14, as previously indicated.

In the operation of the cyclone the gas or vapor carrying finely divided solid particles which are to be separated therefrom is introduced tangentially into the annular space 6. The body of gas entering the cyclone is thus given a spiral motion which causes suspended solid particles to be thrown against the inside surface of casing 1. The separated particles then fall down through the annular space 11 into lower space 12 of the cyclone. As the gas proceeds downwardly through the cyclone, the gas nearer the center of the apparatus, which contains the finer particles, tends to pass down through the inner annular space 10. When high velocity jets 7 are employed and gas is introduced through these jets, the spiral motion of the gas within the inner passage is given additional force and velocity. Further separation of solid particles from the gas thus takes place in annular space 10 and the particles which are separated fall down through this annular space and then through the chutes or tubes 14 into the main stream of falling solids. Any residual particles still remaining suspended in the gas passing through the space 10 are removed as the gas proceeds down through the chutes or tubes 14. This results from the rotational twist given the gases by the chutes 14. The gas continues to rotate in a spiral motion as it goes through the tubes. Both the large and the small particles which are separated from the gas are removed from the cyclone through outlet 9. The gas from which the particles have been separated flows inwardly and upwardly and finally is removed from the cyclone through gas outlet 4.

Figure 1 illustrates also an additional feature of construction for introducing gas or other fluid through jets into the annular space 10. A jacket or cylinder 24 is placed around outlet tube 4 so as to provide an annular passage for fluid, gas or liquid, which is supplied to the passage through a pipe 25. The bottom of this jacket 24 is fitted with a hollow annulus or ring in which are fitted a plurality of tangentially directed jets 27 through which air, steam, or other gas or fluid can then be introduced into annular space 10 in the same manner as is done with the high velocity jets 7 in Figure 1. Gas or other fluid to be fed through these jets is introduced into the annular space between outlet tube 4 and jacket 24 through inlet pipe 25. If desired, the jets 7 may be omitted, but it is frequently desirable to employ both jets 7 and 27. It will sometimes be found advantageous to introduce a liquid rather than a gas through the jets 7 or jets 27 in Figures 1 and 3. The advantage thus obtained is that the fine particles will be wet by the liquid and this will greatly enhance the separation of the particles from the gas stream. Another advantage is that when liquid is introduced rather than a gas through the jets more rotational energy can be added to the gas stream for the amount of fluid introduced because of the smaller volume-to-weight ratio of a liquid as compared to a gas.

As previously suggested, it may not be necessary to use both sets of jets 7 and 27, especially if a liquid is injected through one set or the other. It may be found advantageous to inject gas through one set and liquid through the other in some cases, as where the solids are particularly difficult to separate.

Although some types of cyclone separators equipped with concentric walls have been employed prior to the present invention, certain novel features are involved herein which have never heretofore been disclosed. One of these features is the provision for the introduction of a high velocity jet of gas into the inner cylinder in order to impart additional rotational velocity to that part of the gas stream carrying the fine material, thus making more efficient use of the auxiliary jet. Another very important feature is the use of chutes or tubes to carry separated fine material from the zone of high gas velocity to a zone in which there is little or no gas velocity. A very important advantage thus obtained is that the flow of fine material out of the bottom of the separator is not disturbed by the flow of gases leaving upwardly, for example through the outlet tube 4 of Figures 1 to 4.

Still another feature is the provision of chute members such as 14 having a slight rotational twist or helical arrangement in order to provide for still greater efficiency in separating very fine particles from the gas stream.

Figure 5:
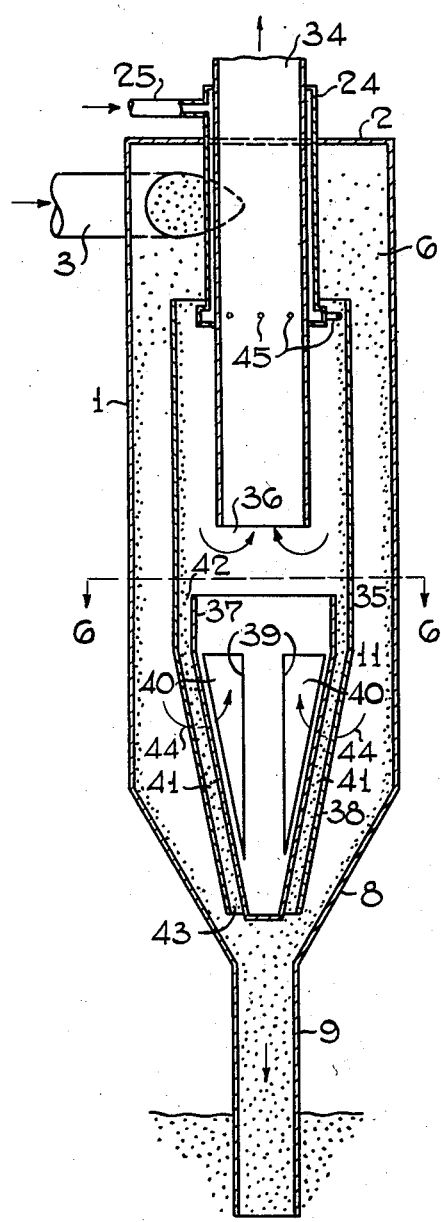
Figure 5 is a vertical section of another modification of the invention, being generally similar to Figure 1.
Figure 6:
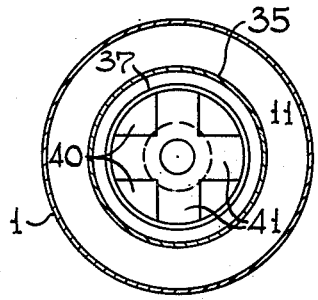
Figure 6 is a transverse section of the apparatus shown in Figure 5, taken substantially along the line 6—6 of Figure 5 and looking downward.

Figures 5 and 6 illustrate another embodiment of the invention wherein the outer shell and the feed pipes bear the same reference characters as in Figures 1 to 4. The annular inner shell element 35, corresponding to element 5 of Figures 1 to 4, is continued well below the exit port 36, which is the lower end of tube 34, corresponding to tube 4 of Figure 1. In this form of the invention, an inner conical or frusto-conical element 37 is built within a lower converging part 38 of shell 35, being connected therewith by elements 39 which surround and define triangular openings 40. For example, the elements 35 and 37 may be formed of sheet metal and the openings 39 formed by forcing metal of the inner element 37 outwardly and metal of outer element 35 inwardly, the parts being suitably secured together by welding or the like. As a result, a series of tubes 41 extend downwardly from an annular space 42 to a small annular space 43 at the bottom of members 35 and 37.

It will be understood that with the construction shown in Figures 5 and 6, gases containing solids are admitted through conduit 3 into the main separating zone 6. Due to the tangential disposition of feed pipe or conduit 3, the gases are given a rapid rotary motion, as previously described, and the major portion of the solids separate against the outer wall 1. The inner gases descend inside the annular member 35 where their rotation is greatly accelerated by tangential jets of fluid (gas, vapor, or liquid, preferably the latter, where the fine solids are particularly difficult to separate). These tangential jets emerge from the annular tube 24, fed by a pipe or conduit 25, through tangentially arranged nozzle elements 45.

The rapidly rotating and descending gases within the annular member 35 lose velocity and flow inwardly and upwardly after passing the lower end 36 of gas exit tube 34. The separated solids, however, fall into the annular passage 42 and descend through tubes 41. Gases outside of member 35 pass inwardly and upwardly through the openings 40. In so doing, they are completely separated from the fine solid particles within tubes 41 so the latter are not picked up but continue to fall through annular passage 43 into the converging body of catalyst which falls along the inner surface of outer wall 1 of the separator. The flow of gases through the openings is indicated at 44 by the arrows, Figure 5.

Figure 7:
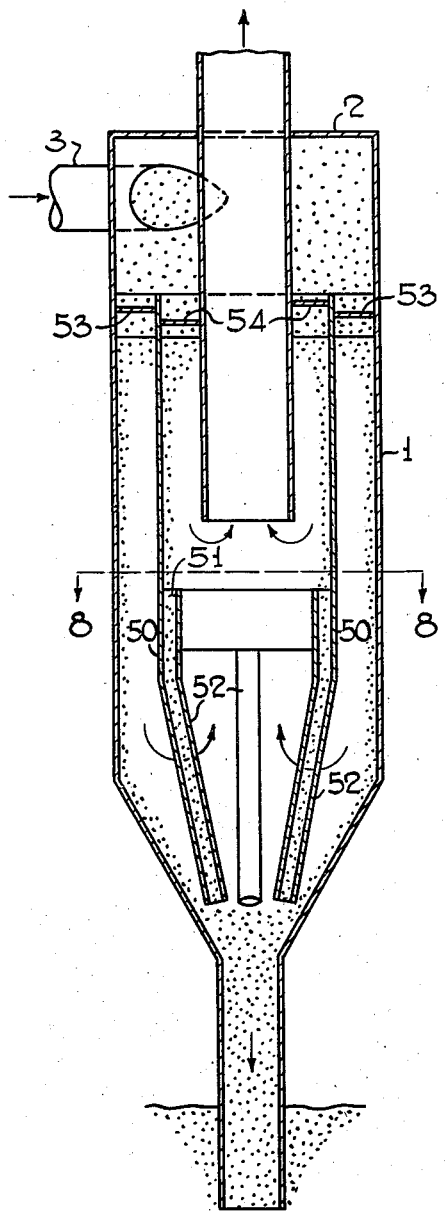
Figure 7 is a vertical sectional view of a further modified form of the invention.
Figure 8:
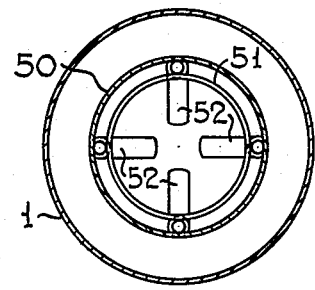
Figure 8 is a transverse sectional view of the apparatus of Figure 7, taken substantially along the line 8—8 of Figure 7.

Figures 7 and 8 show still another construction modification where an annular trough 51 is provided within the inner shell 50, which corresponds to shells 5 and 35 previously described. This trough is built with a plurality of tubes 52 appropriately attached thereto or formed integrally therewith. The fine solid particles descending inside the wall 50 fall into trough 51 and descend through the tubes 52 to join the main body of catalyst at the bottom.

The modification of Figures 7 and 8 may also include a different type of means for increasing rotational velocity. Such means is shown at 53 and 54 as inclined vanes in the outer and inner annular passages. The descending gases passing through these vanes are given additional rotary momentum to further facilitate the separation of solids. If desired, jets such as 7 or 27, Figure 1, or jets 45, Figure 5, may be used in addition to the vanes 53 and 54. The vanes may be arranged so that horizontal elements thereof are arranged either radially or tangentially, but the latter is preferable as it tends to throw the solids to the outside.

Figure 9:
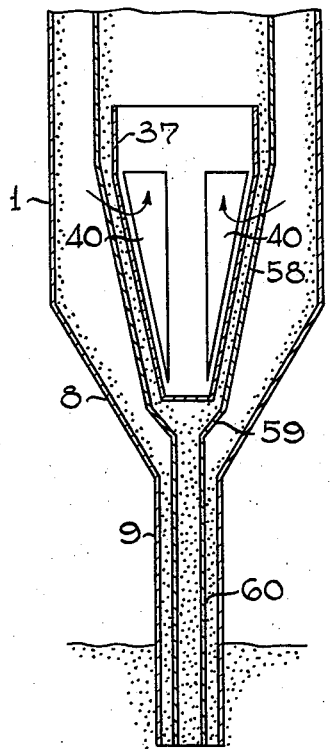
Figure 9 is a vertical sectional view of another modified form of apparatus.

A still further modification is shown in Figure 9 which is like Figure 5 except that the outer element 58 of the inner separator wall, corresponding to element 38 of Figure 5, is continued downwardly by a hollow frusto-conical extension 59 and a tubular extension 60 which is preferably but not necessarily cylindrical in shape. By this means the fine solids which separate in the inner zone may be separated from the coarser solids which separate in the outer zone. They may be conveyed to separate storage bins or separate elements of a circulatory system if this is desired. The inner member 37 and the openings 40 are arranged as in Figure 5.

Figure 10:
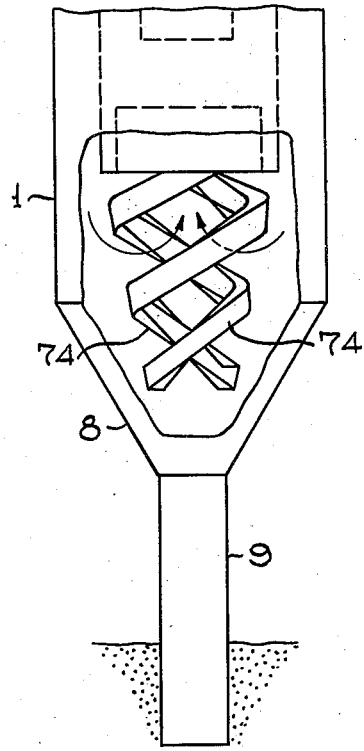
Figure 10 is a vertical sectional view of still another modification of the invention.

Figure 10 shows a modification of the apparatus of Figure 1 wherein the chutes 74, corresponding to chutes 14 of Figure 1, are spiraled extensively. The angle and extent of spiraling should be such that the chutes 74 are not whipped by eddy currents which would remove or entrap any of the solids which are flowing down chutes 74. Other elements may be arranged either as in Figures 1 to 4 or as in Figure 5 or Figure 7 and therefore a detailed description is not necessary.

It will be understood that the essence of the invention is the apparatus and method for bringing a stream of fluid, especially a gas stream, into a down-flowing separating zone of generally circular cross section, imparting a strong rotary movement to said stream to separate most of the solids against the outer wall of the casing while forcing the lighter fluid portions (i. e., the part containing the most finely divided solids) to the central zone. This inner or more central part of the stream is passed downwardly through the inner shell and given a very substantial angular or rotary acceleration, preferably by jet means, as in Figure 1, although the vanes of Figure 7 may suffice. This separates the very fine solids which are carried in conduits, either chutes or tubes, to a receiver, while the fluid stream outside the inner shell passes centrally to the exit without picking up or otherwise interfering with the stream of fine particles which has been separated from the inner stream.

Although the above description discloses what is believed to be a preferred and practical embodiment of this invention, it will be understood by those skilled in the art that the specific details of construction and the arrangement of parts as shown are largely by way of example and are not to be construed as limiting the scope of the invention in any manner.

What is claimed is:

1. A cyclone separator for separating finely divided solid particles from gaseous fluids comprising an outer casing of circular cross section, a tangential inlet in the upper portion of said casing for the introduction of the gaseous fluids containing the solid particles, an outlet tube coaxially disposed within said casing extending from the lower portion of said casing through the top thereof for the removal of gaseous fluid from the casing, a coaxially disposed inner cylindrical shell spaced substantially midway between said casing and said outlet tube, the upper end of said inner cylindrical shell terminating at a level below the tangential inlet, the lower end of said inner cylindrical shell terminating at about the lower end of said outlet tube, a plurality of spaced conduit members attached to the lower end of said inner cylindrical shell extending downwardly into the lower portion of the cyclone separator, said inner cylindrical shell dividing the stream of gaseous fluids containing solids into two parts, one part flowing spirally downward between said inner shell and said casing thence between said spaced conduit members to the outlet tube and the other part flowing spirally downward through the annular passageway between the inner shell and the outlet tube and thence into the outlet tube, nozzle means arranged adjacent the upper end of said inner cylindrical shell positioned to discharge a stream of fluid at high velocity tangentially into said inner shell to increase the rotational velocity of the gaseous stream passing through the annular passageway between the said inner cylindrical shell and the said outlet tube and an outlet in the bottom of said outer casing for the withdrawal of separated solid particles.

2. A cyclone separator according to claim 1 in which the lower end of the inner shell between said conduit members is turned inwardly and upwardly to form an inverted V-shaped lip between adjacent conduit members for directing separated particles into said conduits.

3. A cyclone separator according to claim 1 in which the spaced conduit members attached to the lower end of said inner cylindrical shell member extend spirally downward into the lower portion of the cyclone separator.

BRADFORD E. BAILEY.

REFERENCES CITED

The following references are of record in the file of this patent:

UNITED STATES PATENTS

| Number | Name | Date |
|---|---|---|
| 638,983 | Osborne | Dec. 12, 1899 |
| 969,769 | Brassert et al. | Sept. 13, 1910 |
| 1,344,585 | Hewitt et al. | June 22, 1920 |
| 1,405,399 | Donaldson | Feb. 7, 1922 |

FOREIGN PATENTS

| Number | Country | Date |
|---|---|---|
| 209,246 | Great Britain | Jan. 10, 1924 |
| 528,606 | Great Britain | Nov. 1, 1940 |
| 236,371 | Germany | July 4, 1911 |
| 105,056 | Sweden | July 21, 1942 |
| 58,738 | Denmark | May 19, 1941 |